(12) United States Patent
Mukherjee et al.

(10) Patent No.: US 12,049,864 B2
(45) Date of Patent: Jul. 30, 2024

(54) SHELL CORE AND WIND TURBINE BLADE HAVING A BLADE SHELL COMPRISING SUCH A SHELL CORE

(71) Applicants: Blade Dynamics Limited, Eastleigh Hampshire (GB); LM Wind Power A/S, Kolding (DK)

(72) Inventors: Manish Mukherjee, Eastleigh Hampshire (GB); Tobias Bergner, Kolding (DK); Laszlo Bartha, Kolding (DK)

(73) Assignees: BLADE DYNAMICS LIMITED, Eastleigh (GB); LM WIND POWER A/S, Kolding (DK)

( * ) Notice: Subject to any disclaimer, the term of this patent is extended or adjusted under 35 U.S.C. 154(b) by 286 days.

(21) Appl. No.: 17/620,500

(22) PCT Filed: Jun. 16, 2020

(86) PCT No.: PCT/EP2020/066608
§ 371 (c)(1),
(2) Date: Dec. 17, 2021

(87) PCT Pub. No.: WO2020/254312
PCT Pub. Date: Dec. 24, 2020

(65) Prior Publication Data
US 2022/0325692 A1      Oct. 13, 2022

(30) Foreign Application Priority Data

Jun. 18, 2019  (GB) .................................. 1908707.1

(51) Int. Cl.
*B29C 70/08*       (2006.01)
*B29C 70/44*       (2006.01)
(Continued)

(52) U.S. Cl.
CPC .......... *F03D 1/0675* (2013.01); *B29C 70/086* (2013.01); *B29C 70/443* (2013.01);
(Continued)

(58) Field of Classification Search
CPC ........................... F03D 1/0675; B29C 70/443
(Continued)

(56) References Cited

U.S. PATENT DOCUMENTS 6,216,752 B1      4/2001  Bailey
10,119,520 B2 *  11/2018  Pawar .................. F03D 1/0675
(Continued)

FOREIGN PATENT DOCUMENTS

JP       2006248456 A       9/2006
JP       2012176542 A       9/2012
(Continued)

*Primary Examiner* — James D Sells
(74) *Attorney, Agent, or Firm* — Nath, Goldberg & Meyer; Tanya E. Harkins (57) ABSTRACT

A shell core (1) configured for being incorporated in a shell of a fiber reinforced polymer composite structure wherein:
 the core has a first surface (2) and an opposite second surface (3),
 a first groove (4) is formed in the first surface (2) and divides the core into a first core part (5) and a second core part (6),
 the first groove (4) is defined by two opposing side walls (7a,7b) and a bottom (8),
 the distance T1 between the bottom (8) of the groove (4) and the second surface (3) of the core is of such a size that the core is flexible/bendable along the first groove, and
 the opposing walls (7a,7b) converge towards the bottom (8) forming an angle A1 of at least 45° with each other.

20 Claims, 8 Drawing Sheets (51) Int. Cl.
*F03D 1/06* (2006.01)
*B29L 31/08* (2006.01)

(52) U.S. Cl.
CPC ..... *B29L 2031/085* (2013.01); *F05B 2230/20* (2013.01); *F05B 2280/6003* (2013.01)

(58) Field of Classification Search
USPC ........................................................ 156/245
See application file for complete search history.

(56) References Cited

U.S. PATENT DOCUMENTS

| | | |
|---|---|---|
| 2011/0081514 A1 | 4/2011 | Day |
| 2014/0217651 A1 | 8/2014 | Grove-Nielsen |
| 2016/0193793 A1 | 7/2016 | Filippini |

FOREIGN PATENT DOCUMENTS

| | | |
|---|---|---|
| WO | 2009003477 A1 | 1/2009 |
| WO | 2018015250 A1 | 1/2018 |

* cited by examiner

SHELL CORE AND WIND TURBINE BLADE HAVING A BLADE SHELL COMPRISING SUCH A SHELL CORE

This is a National Phase Application filed under 35 U.S.C. 371 as a national stage of PCT/EP2020/066608, filed Jun. 16, 2020, an application claiming the benefit of British Application No. 1908707.1, filed Jun. 18, 2019, the content of each of which is hereby incorporated by reference in its entirety.

FIELD OF THE INVENTION

The present disclosure relates to a shell core configured for being incorporated in a shell of a fiber reinforced polymer composite structure, such as a wind turbine blade, and for being used in manufacturing such a structure, e.g. by a resin impregnation process such as Vacuum Assisted Vacuum Transfer Moulding (VARTM).

BACKGROUND OF THE INVENTION

The present disclosure relates to a fiber reinforced polymer composite structure such as a wind turbine blade comprising a shell structure comprising a shell core arranged between an outer laminate layer and an inner laminate layer. When using a traditional core made of balsa wood or foamed polymer material, it is impossible or challenging to provide a sharp corner as traditional cores cannot be bent to provide a sharp corner. For obtaining a sharp corner, a separate loose corner element can be used. However, such separate loose corner elements tend to slip relative to the core and to no be maintained in the intended position relative to the core.

The use of traditional cores is especially challenging in the manufacturing of large structures such as wind turbine blades.

The problem is known from the manufacturing of wind turbine blades having a flat back section of the trailing edge and where it is desirable to provide a sharp corner between the flat back section of the trailing edge and the suction side and/or the of the pressure side of the wind turbine blade.

SUMMARY OF THE INVENTION

It is an object of the present invention is to provide an improved shell core configured for being incorporated in a shell of a fiber reinforced polymer composite structure, such as a wind turbine blade, and for being used in manufacturing such a structure, e.g. by a resin impregnation process such as Vacuum Assisted Vacuum Transfer Moulding (VARTM).

An additional object of the present invention is to provide a wind turbine blade with a blade shell having a blade shell part comprising an improved shell core arranged between an inner and an outer laminate. The above first object of the invention is obtained by a shell core configured for being incorporated in a shell of a fiber reinforced polymer composite structure, such as a wind turbine blade, and for being used in manufacturing such a structure e.g. by a resin impregnation process such as Vacuum Assisted Vacuum Transfer Moulding (VARTM), wherein
the core has a first surface and an opposite second surface,
a first groove is formed in the first surface of the core and divides the core into a first core part and a second core part,
the first groove is defined by two opposing side walls and a bottom and has a height H1 as measured from the first surface to the bottom,
the distance T1 between the bottom of the groove and the second surface of the core is of such a size that the core is flexible/bendable along the first groove, and
the opposing walls have opposing wall portions converging as seen from the first surface towards the bottom and form an angle A1 of at least 45° with each other as seen in a cross-sectional view.

The opposing wall portions can be configured to abut each other when the first and second part are bent said at least 45° towards each other along the bottom of the first groove.

Thereby, it is possible to provide a sharp corner with a sharp angle of at least 45° between the first core part and second core part.

The angle of the opposing wall portions can advantageously be chosen such that it essentially corresponds to the desired angle between the first and the second core part when the opposing wall portions abut each other.

The distance T1 between the bottom of the groove and the second surface of the core can be 1 to 6 mm, such as 1-4 mm.

The side walls can converge from the first surface towards the bottom to define an essentially V-shaped cross section of the first groove (the angle A of the V-shaped cross section being at least 45°).

The angle A can be in the interval 55° to 125°, such as 70° to 110°.

The first groove can be symmetric about a centre line forming an angle A1/2 with the respective side wall portions or side walls, i.e. being the bisecting line of the first groove.

The centre line can extend perpendicular to the first surface of the core. This is especially advantageous when the first surface or the core is inclined towards the second surface and the groove is formed in the first surface and extends transversely of the inclination of the first surface.

Contrary to the situation where the centre line extends perpendicular to the second surface of the core, no step is provided between the core parts when the core parts are bent against each other along the bottom of the groove to bring the opposing wall portions of the groove into mutual abutment.

The second surface of the core can be formed of a flexible fabric scrim, such as a fiber glass fabric scrim.

The distance T1 between the bottom of the groove and the second surface of the core can be formed by the flexible fabric scrim. Alternatively, the flexible fabric scrim forms a portion of the distance T1 between the bottom of the groove and the second surface of the core.

The first surface of the core can be formed of a flexible fabric scrim, such as a fiber glass fabric scrim.

The first part and optionally also the second part of the core can comprise at least one and preferably a number of second grooves formed in the first surface and arranged parallel to the first grove and being mutually spaced and spaced from the first groove, the second groove being defined by two opposing side walls and a bottom and having a height H2 as measured from the first surface to the bottom, the distance T2 between the bottom of the second groove and the second surface of the core being of such a size that the core is flexible/bendable along the bottom of the second groove.

In this way, it is possible to bend the shell core along the second groves during manufacture of a fiber reinforced structure in which the shell core is to be incorporated in order to at least partly adapt the shape of the shell core to the shape of the fiber reinforced structure.

The distance T2 between the bottom of the groove and the second surface of the core can be 1-6 mm, such as 1-4 mm.

The distance T2 between the bottom of the groove and the second surface of the core can be formed by the flexible fabric scrim. Alternatively, the flexible fabric scrim can form a portion of the distance T2 between the bottom of the groove and the second surface of the core.

The opposing walls can have opposing wall portions converging as seen from the first surface towards the bottom and forming an angle A2 of at least 4°, such as 6° to 40°, with each other as seen in a cross-sectional view.

The converging opposing wall portions can be configured to abut each other when the first and second core parts are bent said at least 4° towards each other along the second groove.

The second groove can be symmetrical about a centre line forming an angle A2/2 with the respective the side wall portions or side walls, i.e. being the bisecting line of the second groove.

The first part and optionally also the second part of the core can comprise at least one and preferably a number of mutually spaced third grooves formed in the first surface and arranged transversely of the first groove, the third groove being defined by two opposing side walls and a bottom and having a height H3 as measured from the first surface to the bottom, the distance T3 between the bottom of the third groove and the second surface of the core being of such a size that the core is flexible/bendable along the bottom of the third groove.

The third grooves allow for bending the shell core along lines transversely to the first groove and thereby at least partly obtain an adaption of the shape of the shell core to the shape of the fiber reinforce structure in which the shell core is to be incorporated.

The distance T3 between the bottom of the groove and second surface of the core can be 1-6 mm, such as 1-4 mm.

The distance T3 between the bottom of the groove and the second surface of the core can be formed by the flexible fabric scrim. Alternatively, the flexible fabric scrim forms a portion of the distance T3 between the bottom of the groove and the second surface of the core.

By means of both the previously mentioned second grooves and the above mentioned third grooves, it is possible to obtain a substantially complete adaption of the shape of the shell core to the shape of the fiber reinforce structure in which the shell core is to be incorporated.

The opposing walls of the third groove can have converging wall portions as seen from the first surface towards the bottom and form an angle A3 of at least 4°, such as 6° to 40°, with each other as seen in a cross-sectional view.

The converging opposing walls can be configured to abut each other when the first and second core parts are bent said at least 4° towards each other along the third groove.

The third groove can be symmetrical about a centre line forming an angle A3/2 with the respective the side wall portions or side walls, i.e. being the bisecting line of the third groove.

Alternative to or in addition to the second and third grooves, the first core part and optionally also the second core part can comprise a number of mutually spaced slits formed in the first surface and being arranged parallel to the first groove and a number of mutually spaced slits formed in the first surface and arranged transversely to the first groove, the distance T between a slit bottom and the second surface of the core being of such a size that the core is flexible/bendable along a slit bottom.

The further object of the present invention is obtained by a wind turbine blade extending from a root end to a tip end along a longitudinal axis and comprising a root region, a transition region and an airfoil region, the wind turbine blade additionally comprising a profiled contour with a leading edge and a trailing edge and a chord extending between the leading edge and the trailing edge, a blade shell with a first blade shell part with a pressure side and a second blade shell part with a suction side, the first and second blade shell parts extending from the root end to the tip end and joined along a leading-edge glue joint and a trailing edge glue joint, the first blade shell part comprises a first shell core arranged between an inner laminate and an outer laminate and second blade shell part comprising a second shell core arranged between an inner laminate and an outer laminate, one of the first and second shell cores being a shell core according to the present invention, the second core part having been bent at least 45° towards the first core part along the bottom of the first groove to bring the opposing wall portions of the groove into mutual abutment and to provide a sharp inner corner having a sharp angle of at least 45° between the first part of the shell core and the second part of the shell core.

The second part of the shell core can form part of a flatback section of the trailing edge of the blade.

The second part of the shell core can have a height of at least 0.4 HF such as 0.4 to 0.99 HF, where HF is the height of the flatback section in the respective cross section.

The other one of the first and second shell cores can also be a shell core according to any of the preceding claims 1 to 13, where the second core part has been bent at least 45° towards the first core part along the bottom of the first groove to bring the opposing wall portions of the groove into mutual abutment and to provide a sharp inner corner having a sharp angle of at least 45° between the first part of the shell core and the second part of the shell core, and the second part of both the first and second shell core forming a part of the flat back section of the trailing edge of the blade, and the second part of the first shell core and the second part of the second shell core together having a height of at least 0.4 HF such as 0.4 to 0.99 HF, where HF is the height of the flatback section in the respective cross section.

BRIEF DESCRIPTION OF THE FIGS.

Embodiments of the invention will be described in more detail in the following with reference to the accompanying figures. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION OF THE INVENTION

Figures 1, 1A:
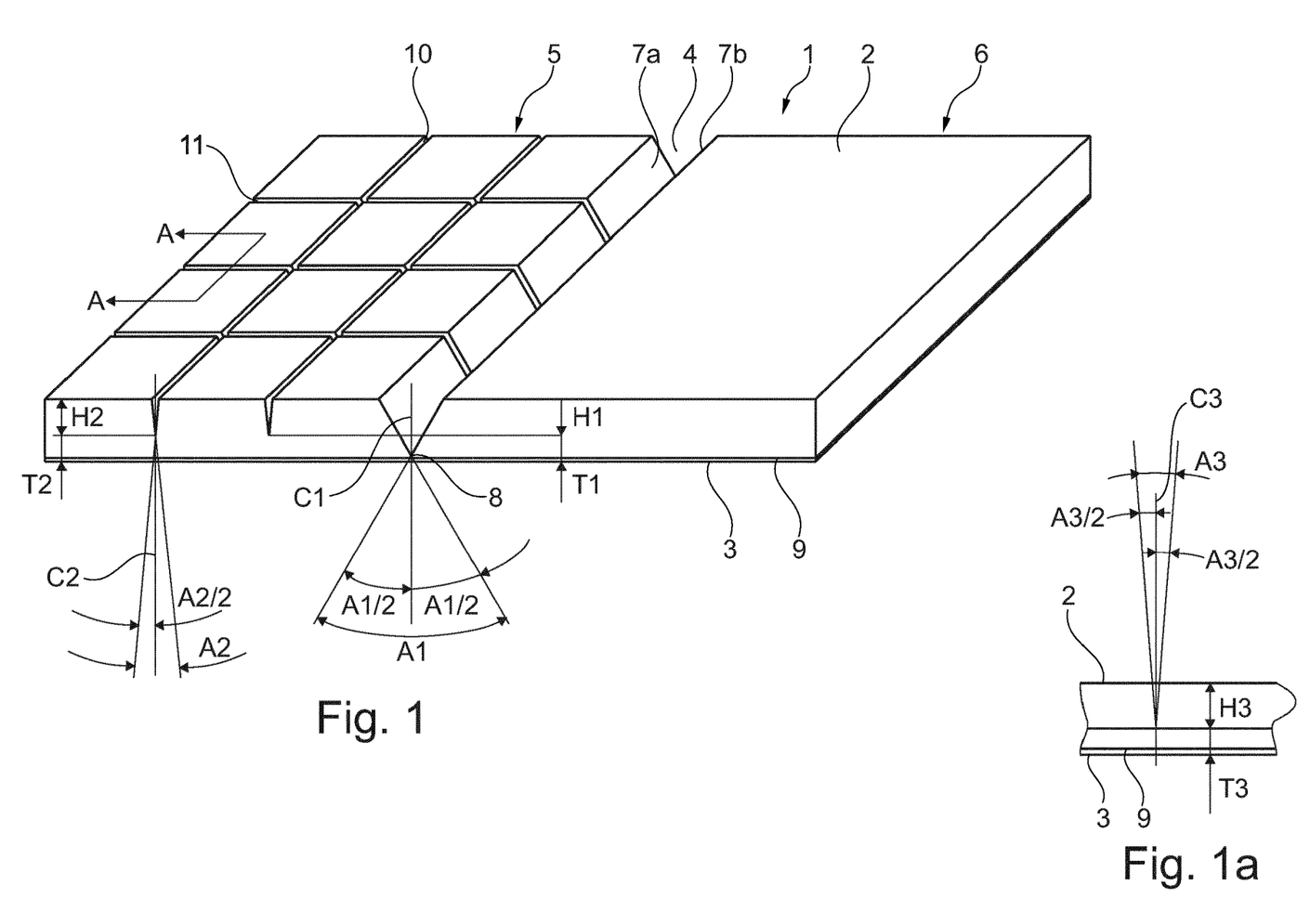
FIG. 1 is a schematic illustration of a part of an exemplary core according to the invention.
FIG. 1a is a sectional view along the line A-A in FIG. 1

FIG. 1 is a schematic illustration of a part of an exemplary shell core 1 according to the invention configured for being incorporated in a shell structure sandwiched between two fibre reinforced polymer layers. The shell core may comprise or be made of a core material, such as a material selected from a thermoset or thermoplastic foamed polymer or balsa wood or a combination thereof.

The shell core 1 comprises a first surface 2 and an opposite second surface 3. In the present example, the second surface is formed of a flexible fabric scrim 9, such as a flexible fibre fabric scrim. In a not shown example, the first surface of the shell core may be formed of a flexible scrim or both the first and the second surface of the shell core may be formed by a flexible scrim. A first groove 4 is formed in the first surface 1 and divides the shell core 1 into a first core part 5 and a second core part 6. The first groove 4 is defined by two opposing sidewalls 7a, 7b and a bottom 8 and has a height H1 extending over a majority of the height of the shell core 1. The opposing side walls 7a, 7b converge towards each other as seen from the first surface towards the bottom and forms a V-shaped angle A1 of at least 45° with each other as seen in a cross-sectional view. In the example shown, the angle A1 is approximately 60° and may preferably be in the interval 55° to 125°, such as 70° to 110°. The distance T1 between the bottom 8 of the first groove 4 and the second surface 3 of the shell core is of such a size that the core is flexible/bendable along the bottom of the first groove.

The distance T1 can be advantageously be 1-6 mm.

The first groove 4 can be symmetrical about a centre line C1 forming an angle A1/2 with the respective opposing side walls 7a, 7b and the centre line C can extend perpendicular to the first surface 2 of the shell core 1. Due to the bendability of the shell core along the bottom of the first groove, the first core part 4 and the second core part 5 can be bent against each other until the opposing sidewalls 7a,7b of the first groove 4 abut each and the first and the second core part 5,6 form an angle with each other corresponding to the angle A1 of the first groove 4, being in the present example 60°.

In the example shown, the first core part 5 comprises a number of second grooves 10 formed in the first surface 2 of the shell core 1 and arranged parallel to the first groove 4 and being mutually spaced and spaced from the first groove 4.

The second groove 10 is defined by two opposing side walls and a bottom and has a height H2 as measured from the first surface 2 to the bottom.

The distance T2 between the bottom of the second groove 10 and the second surface 3 of the core is of such a size that the core is flexible/bendable along the bottom of the second groove. The distance T2 can advantageously be 1-6 mm.

The opposing walls converge as seen from the first surface 2 towards the bottom and form as seen in a cross-sectional view an angle A2 of at least 4° such 6° to 40° with each other and in the present example approximately 10° with each other.

The converging opposing wall portions can be configured to abut each other when the first and second core parts are bent said at least 4° towards each other along the second groove. In the example shown, the second groove 10 is symmetrical about a centre line C2 forming an angle A2/2 with the respective the side walls and extends perpendicular to the second surface 3 of the shell core.

The second grooves 10 allow for bending the shell core along lines parallel to the first groove and thereby at least partly obtain an adaption of the shape of the shell core 1 to the shape of the fiber reinforced structure in which the shell core is to be incorporated.

Additionally, in the example shown, the first part comprises a number of mutually spaced third grooves 11 formed in the first surface 2 and arranged transversely of the first grove 4. Each third groove 11 is defined by two opposing side walls and a bottom and has a height H3 as measured from the first surface to the bottom.

The distance T3 between the bottom of the third groove and the second surface 3 of the core is of such a size that the core is flexible/bendable along the bottom of the third groove 11. The distance T3 can be advantageously be 1-6 mm.

The opposing walls of the third groove 11 converge as seen from the first surface towards the bottom and form an angle A3 of at least 4°, such as 6° to 40°, with each other as seen in a cross-sectional view.

The converging opposing walls can be configured to abut each other when the first and second core part is bent said at least 4° towards each other along the third groove. The third groove can be symmetrical about a centre line with the respective the side wall portions or side walls, i.e. being the bisecting line of the third groove 11.

The third grooves 11 allows for bending the shell core along lines transversely to the first groove and thereby at least partly obtain an adaption of the shape of the shell core 1 to the shape of the fiber reinforced structure in which the shell core is to be incorporated.

By means of both the previously mentioned second grooves and the above mentioned third grooves, it is possible to obtain a substantially complete adaption of the shape of the shell core to the shape of the fiber reinforced structure in which the shell core is to be incorporated. It should be noted that the second core part 6 could also be provided with second and or third grooves as described above.

Alternative to or in addition to the second and third grooves 10,11, the first core part 5 and optionally also the second core part 6 can comprise a number of not shown mutually spaced slits formed in the first surface 2 and being arranged parallel to the first groove 4 and a number of mutually spaced slits formed in the first surface 2 and arranged transversely to the first groove 4, the distance between a bottom of a slit and the second surface 3 of the core being of such a size that the core is flexible/bendable along the bottom of the slit.

Figure 9A:
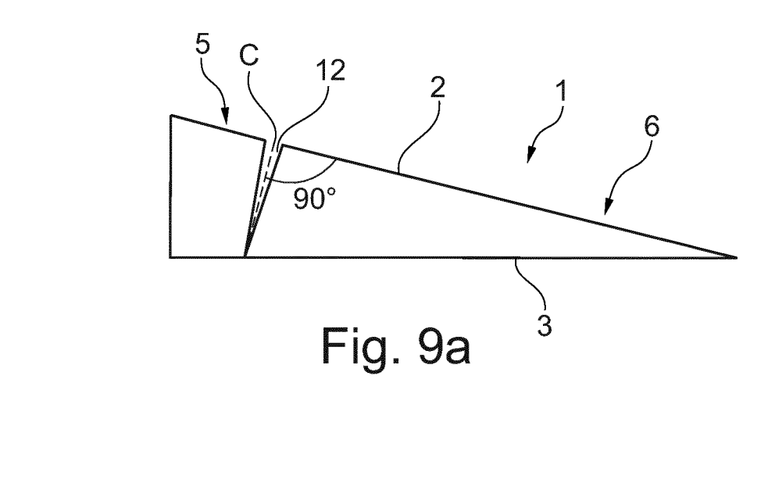
FIG. 9 is a cross sectional view of a core where the first surface is inclined towards the second surface and a groove formed in the first surface has a centre line extending perpendicular to the first surface.
Figure 9B:
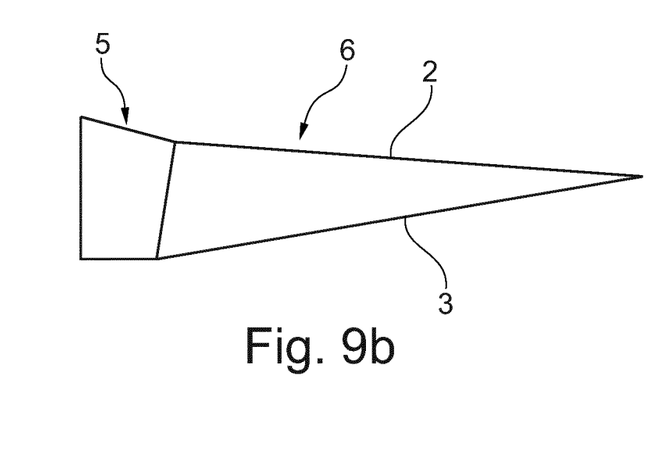

As described above and shown in FIG. 1 the centre line C of the grooves in the first surface 2 extends perpendicular to the first surface 2 of the core 1. As shown in FIG. 1 the centre line C of the grooves extends also perpendicular to the second surface 3 of the core 1 as the first and second surfaces are parallel. However, when the first surface 2 of the core 1 is inclined towards the second surface 3 of the core 1 and a groove extends transversely of the inclination of the first surface 2, as shown in FIG. 9*a*, it is advantageous that the centre line C of a groove 12 extends perpendicular to the first surface 2, as shown in FIG. 9*a*. Thereby no step is provided between the core parts 5.6 when the core parts are bend against each other along the bottom of the groove to bring opposite wall portions of the groove 12 into mutual abutment as shown in FIG. 9*b*.

Figure 10A:
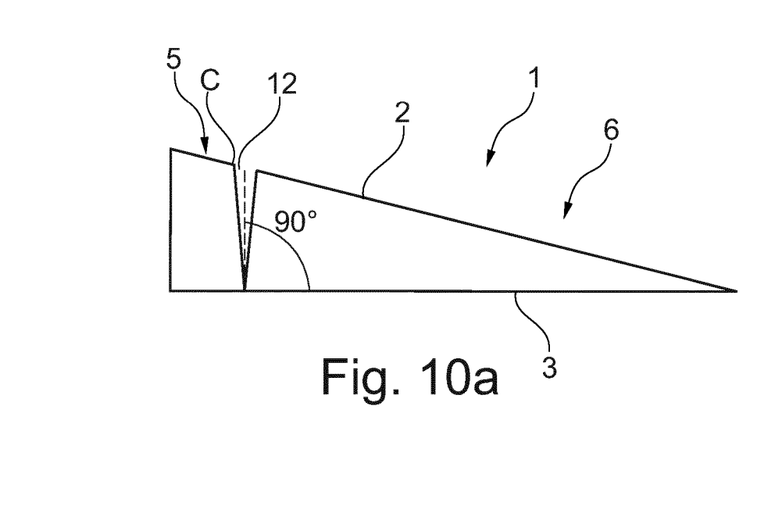
FIG. 10 is a cross sectional view of a core where the first surface is inclined towards the second surface and a groove formed in the first surface has a centre line extending perpendicular to the second surface.
Figure 10B:
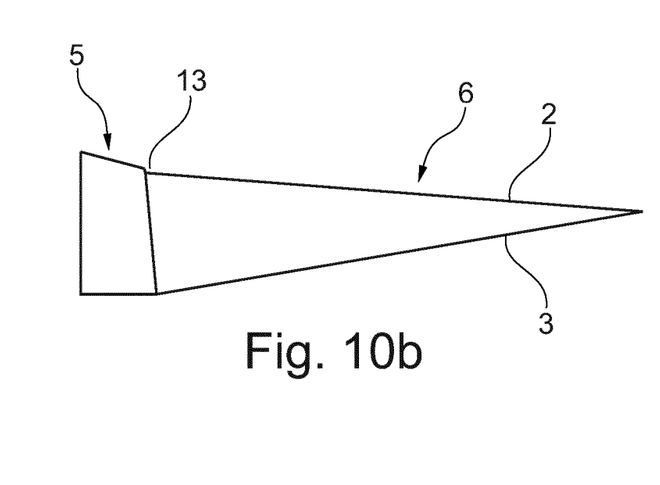

If the first surface 2 of the core 1 is inclined towards the second surface 3 of the core 1 and a groove 12 extends transversely of the inclination of the second surface 2, and the centre line C of a groove 12 extends perpendicular to the first surface 2, as shown in FIG. 10*a*. a step 13 is provided between the core parts 5.6 when the core parts are bend against each other along the bottom of the groove to bring opposite wall portions of the groove 12 into mutual abutment as shown FIG. 10*b*.

Figure 2:
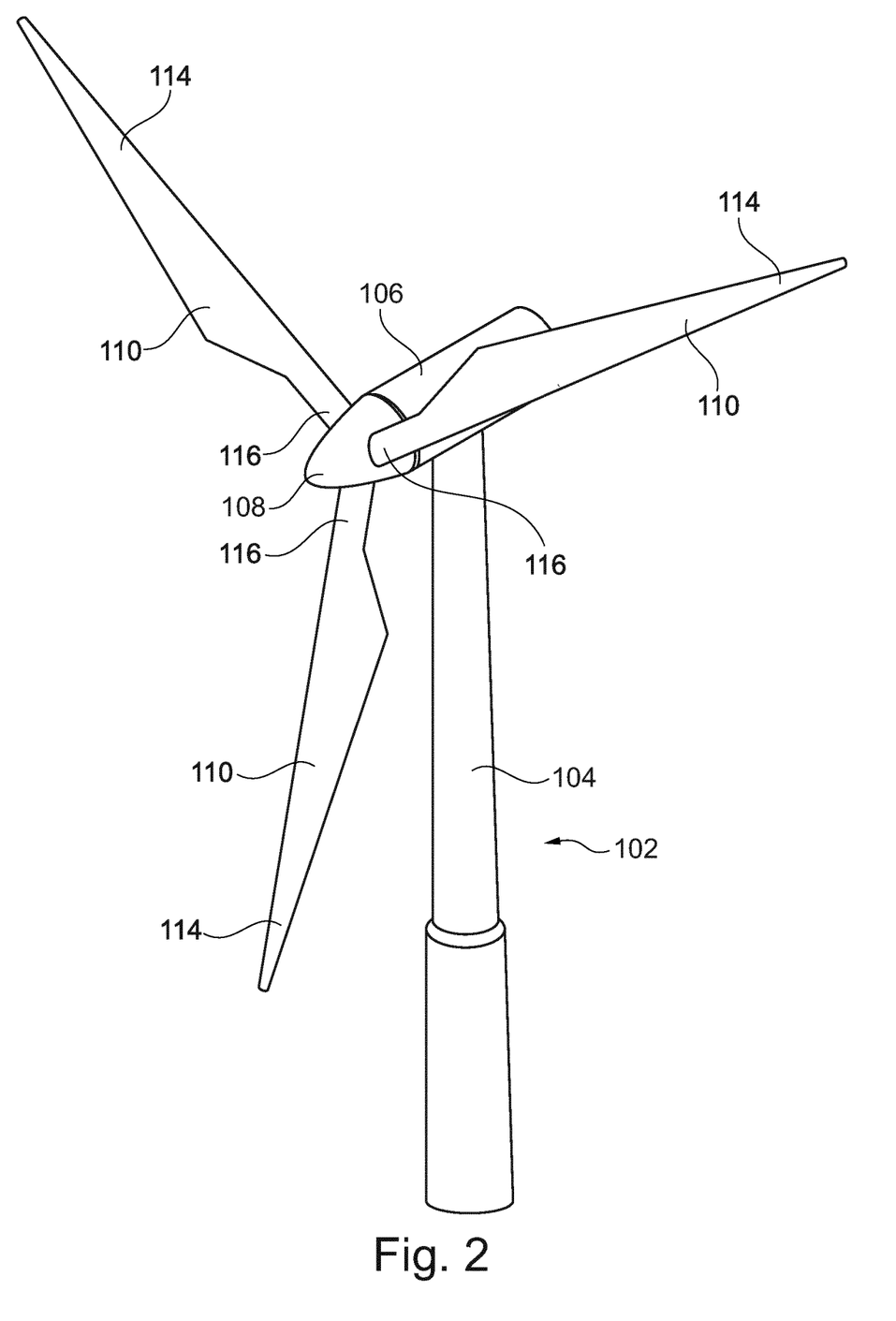
FIG. 2 is a schematic illustration of an exemplary wind turbine.

FIG. 2 illustrates a conventional modern upwind wind turbine 102 according to the so-called "Danish concept" with a tower 104, a nacelle 106 and a rotor with a substantially horizontal rotor shaft. The rotor includes a hub 108 and three blades 110 extending radially from the hub 108, each having a blade root 16 nearest the hub and a blade tip 114 furthest from the hub 108.

Figure 3:
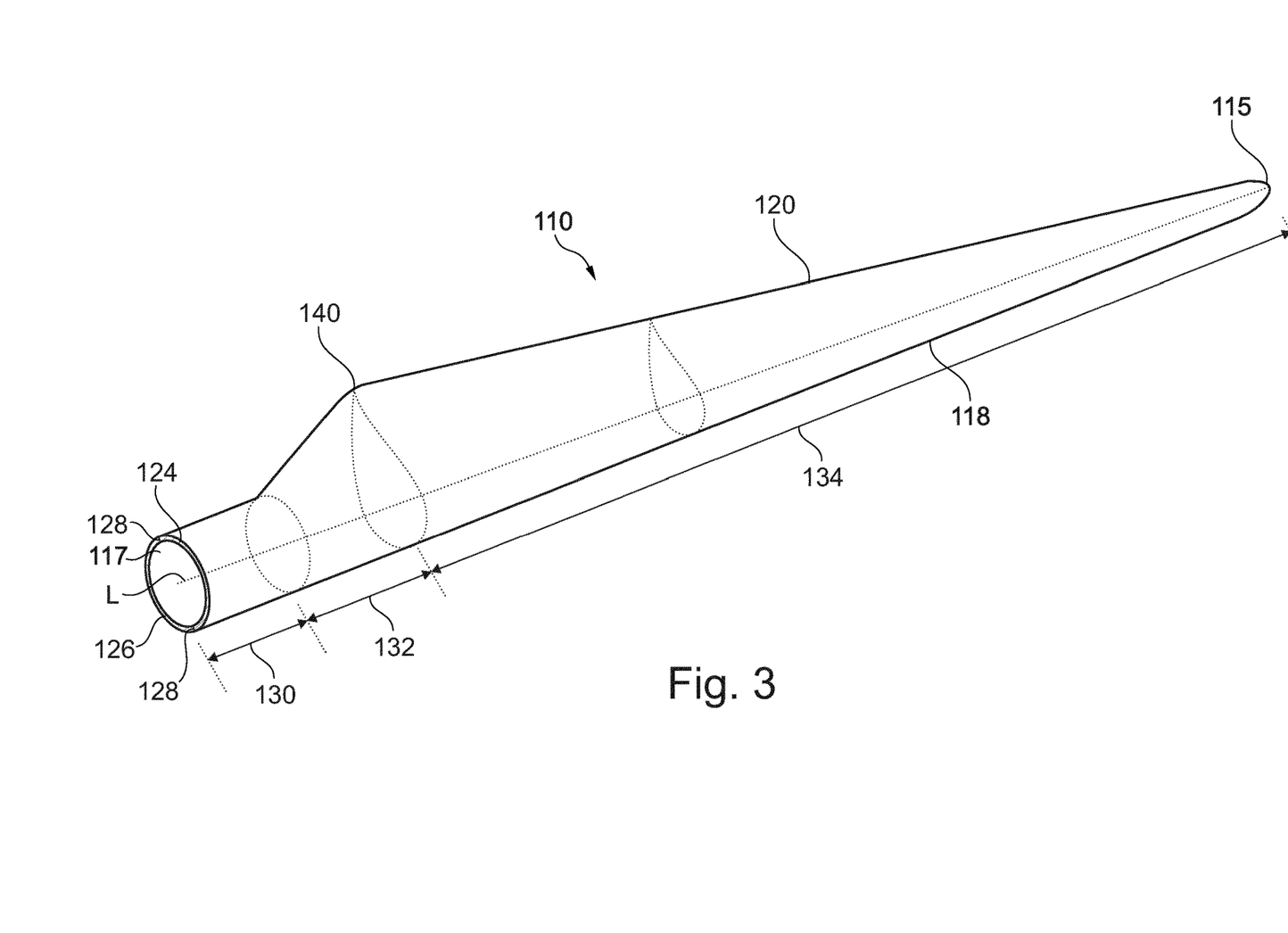
FIG. 3 is a schematic illustration of an exemplary wind turbine blade having a flat back section.

FIG. 3 shows a schematic view of an exemplary wind turbine blade 110. The wind turbine blade 110 has the shape of a conventional wind turbine blade with a root end 117 and a tip end 115 and comprises a root region 130 closest to the hub, a profiled or airfoil region 134 furthest away from the hub and a transition region 132 between the root region 130 and the airfoil region 134. The blade 110 comprises a leading edge 118 facing the direction of rotation of the blade 110, when the blade is mounted on the hub, and a trailing edge 120 facing the opposite direction of the leading edge 118.

The airfoil region 134 (also called the profiled region) has an ideal or almost ideal blade shape with respect to generating lift, whereas the root region 130, due to structural considerations, has a substantially circular or elliptical cross section, which for instance makes it easier and safer to mount the blade 110 to the hub. The diameter (or the chord) of the root region 130 may be constant along the entire root area 130. The transition region 132 has a transitional profile gradually changing from the circular or elliptical shape of the root region 130 to the airfoil profile of the airfoil region 134. The chord length of the transition region 132 typically increases with increasing distance r from the hub. The airfoil region 134 has an airfoil profile with a chord extending between the leading edge 18 and the trailing edge 120 of the blade 110. The width of the chord decreases with increasing distance r from the hub.

A shoulder 140 of the blade 110 is defined as the position where the blade 110 has its largest chord length. The shoulder 140 is typically provided at the boundary between the transition region 32 and the airfoil region 134.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 110 comprises a blade shell comprising two blade shell parts or half shells, a first blade shell part 124 and a second blade shell part 126, typically made of fibre-reinforced polymer. The wind turbine blade 110 may comprise additional shell parts, such as a third shell part and/or a fourth shell part. The first blade shell part 124 is typically a pressure side or upwind blade shell part. The second blade shell part 126 is typically a suction side or downwind blade shell part. The first blade shell part 124 and the second blade shell part 126 are fastened together with adhesive, such as glue, along bond lines or glue joints 128 extending along the trailing edge 120 and the leading edge 118 of the blade 110. Typically, the root ends of the blade shell parts 124, 126 have a semi-circular or semi-oval outer cross-sectional shape.

Figure 4:
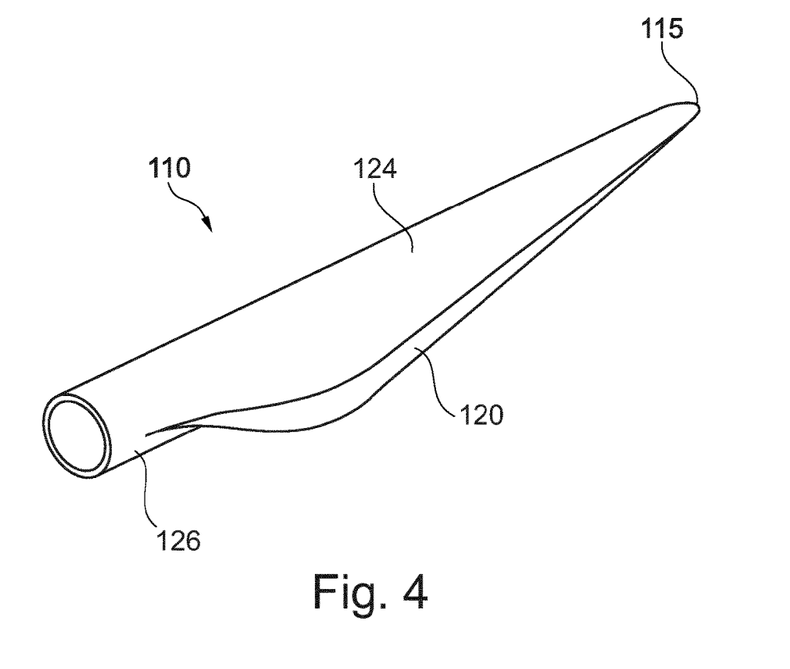
FIG. 4 is a schematic cross-sectional view of an exemplary wind turbine blade having a flat back profile section.

FIG. 4 shows a wind turbine blade 10 with a flatback profile at the trailing edge 120. The trailing edge 120 has a flattened profile. The flattened profile may increase the aerodynamic efficiency and may also reduce the chord width, thereby making it easier to transport the wind turbine blade 110. Furthermore, it may also reduce required manufacturing space.

Figure 5:
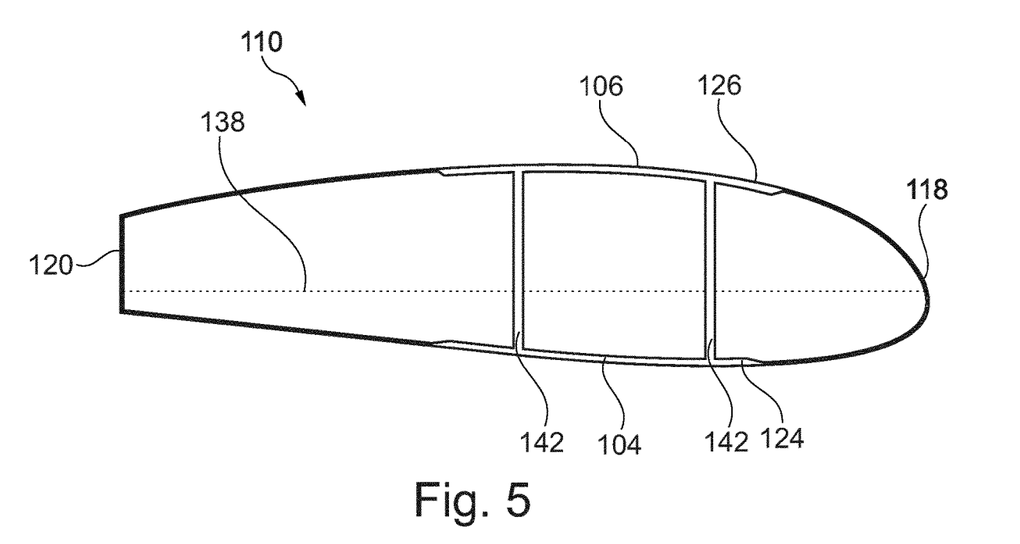
FIG. 5 is a schematic cross-sectional view of an exemplary wind turbine blade according to the invention having a flat back profile section.

FIG. 5 is a schematic diagram illustrating a cross-sectional view of an exemplary wind turbine blade 110, e.g. a cross-sectional view of the airfoil region of the wind turbine blade 110 as described in relation to FIG. 3. The wind turbine blade 10 comprises a leading edge 118, a trailing edge 120, a pressure side 124, a suction side 126 a first spar cap 144, and a second spar cap 146. The trailing edge 120 has a flattened profile for forming a flatback profile. The wind turbine blade 110 comprises a chord line 138 between the leading edge 118 and the trailing edge 120. The wind turbine blade 110 comprises shear webs 142, such as a leading-edge shear web and a trailing edge shear web.

The wind turbine blade 10, such as the shell parts 124, 126, comprises sandwich panels, e.g. comprising lightweight materials such as balsa or foam sandwiched between fibre-reinforced layers. The trailing edge 120 forming the flattened profile may be provided as a third shell part, or as an integral part of the first shell part 24 or the second shell part 126. Alternatively, the trailing edge 120 may be provided by parts of both the first shell part 124 and the second shell part 126.

A glue joint for assembling the first shell part 124 and the second shell part 126 may be provided near the trailing edge 120, such as between a first trailing edge part of the trailing edge 120 and a second trailing edge part of the trailing edge 120. Alternatively, the glue flange may be provided between the trailing edge 120 and the first shell part 124 or between the trailing edge 120 and the second shell part 126.

In the following, three exemplary wind turbine blades are described with respect to the following FIGS. 6 to 8; a first exemplary wind turbine blade comprising a glue joint between the trailing edge (forming part of the second shell part) and the first shell part, a second exemplary wind turbine blade comprising a glue joint between the trailing edge (forming part of the first shell part) and the second shell part, and a third exemplary wind turbine blade comprising glue joint between a trailing edge part (forming part of the first shell part) and a trailing edge part (forming part of the second shell part).

Figure 6:
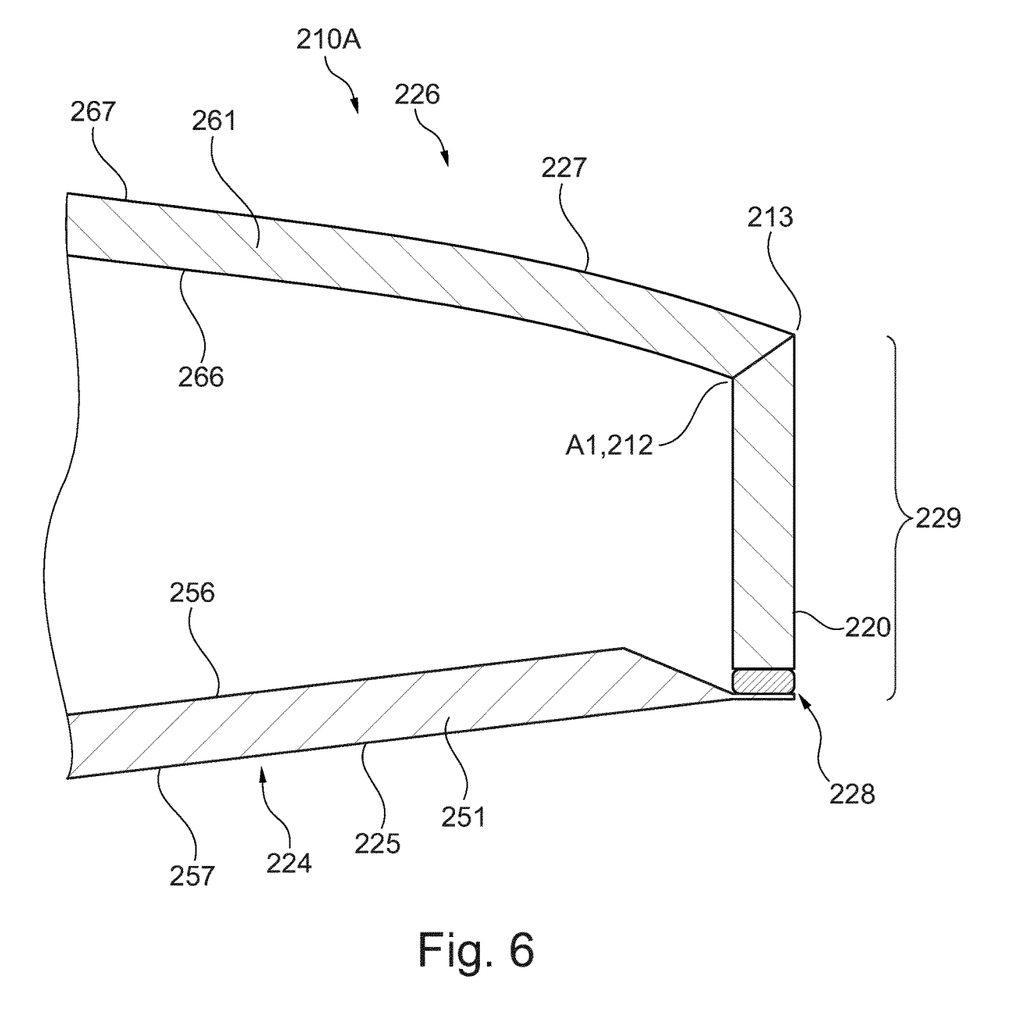
FIG. 6 is a schematic cross-sectional view of a trailing end part of a first exemplary wind turbine blade according to the invention having a flat back profile section.

FIG. 6 shows a schematic cross-sectional view of a trailing end part of a first exemplary wind turbine blade 210A according to the invention having a flat back profile section 229. The wind turbine blade 210A has a profiled contour with a leading edge (not shown) and a trailing edge 220 and comprises a blade shell with a first blade shell part 224 and a second blade shell part 226, the first and second blade shell parts extending from the root end to the tip end along a trailing edge glue joint 228.

The first exemplary wind turbine blade 210A has a first blade shell part 224 with a pressure side 225 and a second blade shell part 226 with a suction side 227.

The first blade shell part 224 comprises a shell core denoted first shell core 251 arranged between a first laminate 256 and a second laminate 257.

The second blade shell part 226 comprises a shell core denoted second shell core 261 (being a shell core according to the present invention such as and essentially corresponding to the exemplary shell core 1 of which a part has been described above with reference to FIG. 1 arranged between a second inner laminate 266 and a second outer laminate 267. As the second shell core 261 of the second blade shell part 226 essentially corresponds to the shell core 1 of which a part has been described above with reference to FIG. 1, the same reference numerals as used for the description of the part of the shell core shown in FIG. 1 will be used in the following description of the second shell core 261 of the second blade shell part 226.

The second shell core 261 (corresponding to the shell core 1) is by the first groove 4 divided into the first core part 5 and the second core part 6. The first and second core parts have been bent against each other along the bottom of the first groove to bring the opposing side walls 7a, 7b of the first groove 4 into mutual abutment to provide an angle A1 between the first core part and the second core part being essentially the same angle as the angle A1 between the converging side walls of the first groove 4. In the illustrated example, the angle A1 is approximately 75° and the inner corner 212 between the core parts is a sharp corner. The outer corner 213 between the bent or folded shell core parts is also a sharp corner.

The second blade shell part 226 and especially the second core part 6 of the second core 261 forms a part of a flat back section 229 at the trailing edge 220 of the wind turbine blade 210A.

Figure 7:
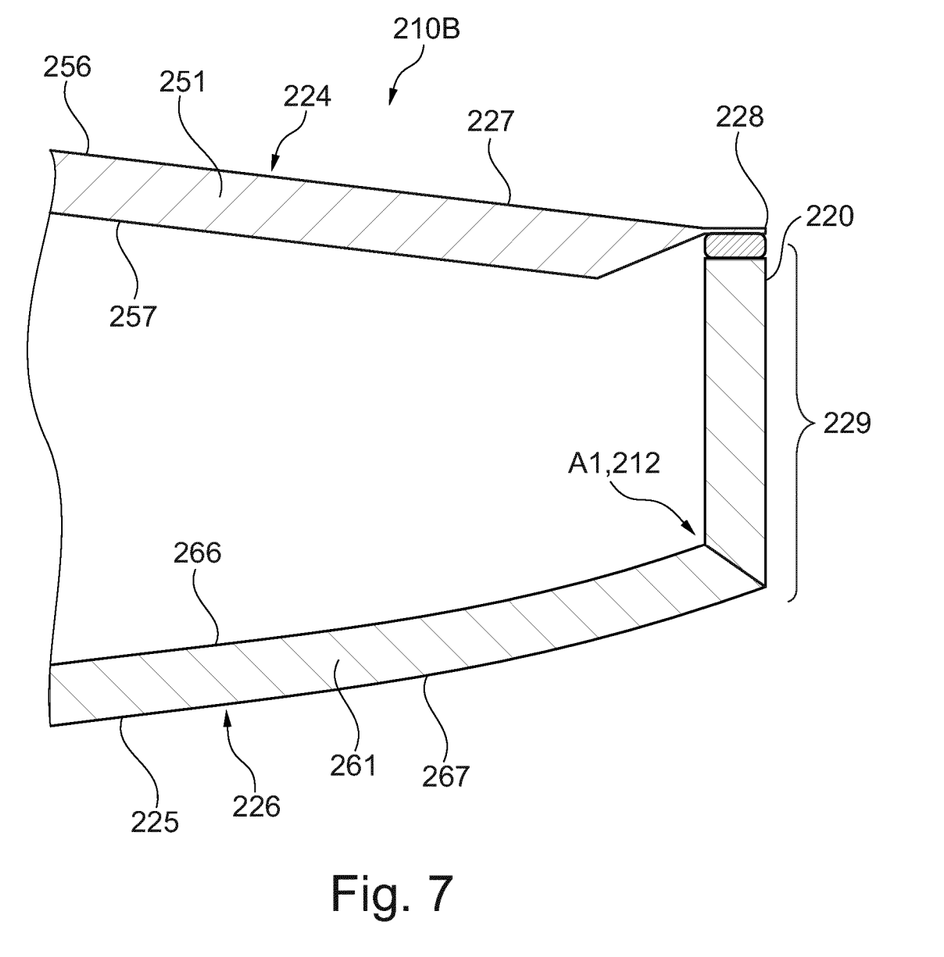
FIG. 7 is a schematic cross-sectional view of a trailing end part of a second exemplary wind turbine blade according to the invention having a flat back profile section.

Further it should be noted that the second outer laminate 267 of the second blade shell part 226 forms a glue face for the trailing edge glue joint 228 of the wind turbine blade 210A and that the first inner laminate of the first blade shell part 224 comprises a glue face for the trailing edge glue joint 228 of the wind turbine blade 210A FIG. 7 shows a schematic cross-sectional view of a trailing end part of a second exemplary wind turbine blade 210B according to the invention having a flat back profile section 229. The wind turbine blade 210B has a profiled contour with a leading edge (not shown) and a trailing edge 220 and comprises a blade shell with a first blade shell part 224 and a second blade shell part 226, the first and second blade shell parts extending from the root end to the tip end along a trailing edge glue joint 228.

The second exemplary wind turbine blade 210B has a first blade shell part 224 with a suction side 227 and a second blade shell 226 part with a pressure side 225.

The first blade shell part 224 comprises a shell core denoted first shell core 251 arranged between a first laminate 256 and a second laminate 257.

The second blade shell part 226 comprises a shell core denoted second shell core 261 (being a shell core according to the present invention such as and essentially corresponding to the exemplary shell core 1 of which a part has been described above with reference to FIG. 1 arranged between a second inner laminate 266 and a second outer laminate 267. As the second shell core 201 of the second blade shell part 226 essentially corresponds to the shell core of which a part has been described above with reference to FIG. 1, the same reference numerals as used for the description of the part of the shell core shown in FIG. 1 will be used in the following description of the of the second shell core 261 of the second blade shell part 226.

The second shell core is by the first groove 4 divided into the first core part 5 and the second core part 6. The first and second core parts have been bent against each other along the bottom of the first groove to bring the opposing side walls 7a, 7b of the first groove 4 into mutual abutment to provide an angle A1 between the between the first core part and the second core part being essentially the same as the angle A1 between the converging side walls of the first groove 4. In the illustrated example, the angle A1 is approximately 75° and the inner corner 212 between the core parts is a sharp corner. The outer corner 213 between the bent or folded shell core parts is also a sharp corner.

The second blade shell part and especially the second part core part 6 of the second core 261 forms a part of a flat back section 229 at the trailing edge 220 of the wind turbine blade 210B.

Figure 8:
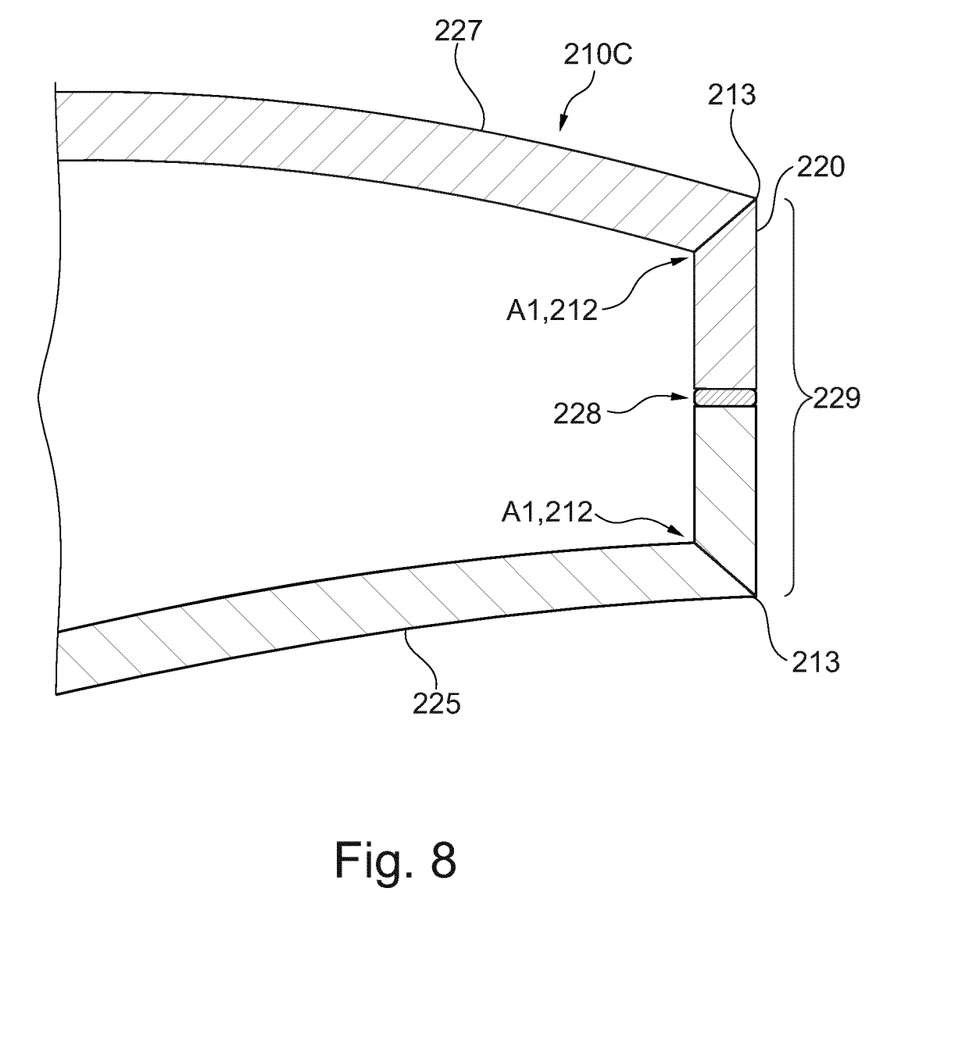
FIG. 8 is a schematic cross-sectional view of a trailing end part of a third exemplary wind turbine blade according to the invention having a flat back profile section.

Further, it should be noted that the second outer laminate 124 of the second blade shell part forms a glue face for the trailing edge glue joint 228 of the wind turbine blade 210, and that the first inner laminate of the first blade shell part 224 comprises a glue face for the trailing edge glue joint 228 of the wind turbine blade 210B FIG. 8 is a schematic cross-sectional view of a trailing end part of a third exemplary wind turbine blade 210C according to the invention having a flat back profile section 229.

The third exemplary wind turbine blade 210C comprises a blade shell part with a pressure side 225 being essentially identical to the blade shell part with the pressure side of the wind turbine blade 200B shown in and described above with reference to FIG. 7, except that the part of the blade shell part forming part of the flat back section is shorter that shown in FIG. 7, and a blade shell part with a suction side 227 being essentially identical to the blade shell part with the suction 227 side of the wind turbine blade 200A shown in and described above with reference to FIG. 6, except that the part of the blade shell part forming part of the flat back section is shorter that shown in FIG. 6.

Each of the blade shell parts of the wind turbine blade 210C of FIG. 8 forming part of the flat back section 229 is provided with a glue face for the trailing edge glue joint 228 of the wind turbine blade 210C.

The invention has been described with reference to embodiments. However, the scope of protection of the invention is not limited to the illustrated embodiments, and alterations and modifications can be carried out without deviating from the scope of invention that is defined by the claims.

LIST OF REFERENCES 1 shell core
2 first surface
3 second surface
4 first groove
5 first shell core part
6 second shell core part
7a, 7b opposing side walls 8 bottom
9 scrim
10 second grooves
11 third grooves
12 groove
13 step
H1 height of first groove
H2 height of second grooves
H3 height of third grooves
T1 distance
T2 distance
T3 distance
A1 angle of first groove
A2 angle of second grooves'
A3 angle of third grooves
C centre line of groove
C1 centre line of first groove
C2 centre line of second grooves
C3 centre line of third grooves
102 wind turbine
104 tower
106 nacelle
108 hub
110 blade
114 blade tip
115 tip end
116 blade root
117 root end
118 leading edge
120 trailing edge
124 first blade shell part
126 second blade shell part
128 bond lines/glue joints
130 root region
132 transition region
134 airfoil region
140 shoulder
142 shear web
144 first spar cap
146 second spar cap
L longitudinal axis
210A wind turbine blade
210B wind turbine blade
210C wind turbine blade
212 inner corner
213 outer corner
220 trailing edge
224 first blade shell part
225 pressure side
226 second blade shell part
227 suction side
228 trailing edge glue joint
229 flat back section
251 first shell core
256 first inner laminate
257 first outer laminate
261 second shell core
266 second inner laminate
267 second outer laminate

The invention claimed is:

1. A shell core configured for being incorporated in a shell of a fiber reinforced polymer composite structure and for being used in manufacturing such a structure, wherein
the shell core has a first surface and an opposite second surface,
a first groove is formed in the first surface of the shell core and divides the shell core into a first core part and a second core part,
the first groove is defined by two opposing side walls and a bottom and has a height H1 as measured from the first surface to the bottom
a distance T1 between the bottom of the first groove and the second surface of the shell core is of such a size that the shell core is flexible/bendable along the first groove, and
the opposing walls have converging opposing wall portions, as seen from the first surface towards the bottom, and form an angle A1 of at least 45° with each other as seen in a cross-sectional view.

2. The shell core according to claim 1, wherein the side walls converge from the first surface towards the bottom to define an essentially V-shaped cross section of the first groove.

3. The shell core according to claim 1, wherein the angle A1 is in the interval 55° to 125°.

4. The shell core according to claim 1, wherein the first groove is symmetric about a centre line forming an angle A1/2 with the respective side wall portions or side walls, the centre line being the bisecting line of the first groove.

5. The shell core according to claim 1, wherein the centre line extends perpendicular to the first surface of the shell core.

6. The shell core according to claim 1, wherein the second surface of the shell core is formed of a flexible fabric scrim.

7. The shell core according to claim 1, wherein the first surface of the shell core is formed of a flexible fabric scrim, such as a fiber glass fabric scrim.

8. The shell core according to claim 1, wherein the first core part of the shell core comprises at least one second groove formed in the first surface and arranged parallel to the first grove and being mutually spaced from the first groove, the second groove being defined by two opposing side walls and a bottom and having a height H2 as measured from the first surface to the bottom, the distance T2 between the bottom of the second groove and the second surface of the shell core being of such a size that the shell core is flexible/bendable along the bottom of the second groove.

9. The shell core according to claim 8, wherein the opposing walls have opposing wall portions converging as seen from the first surface towards the bottom and form an angle A2 of at least 4°, with each other as seen in a cross-sectional view.

10. The shell core according to claim 8, wherein the second groove is symmetrical about a centre line forming an angle A2/2 with the respective the side wall portions or side walls, the centre line being the bisecting line of the second groove.

11. The shell core according to claim 1, wherein the first core part of the shell core comprises at least one third groove formed in the first surface and arranged transversely of the first grove, the third groove being defined by two opposing side walls and a bottom and having a height H3 as measured from the first surface to the bottom, the distance T3 between the bottom of the third groove and the second surface of the shell core being of such a size that the shell core is flexible/bendable along the bottom of the third groove.

12. The shell core according to claim 11, wherein the opposing walls have converging wall portions as seen from the first surface towards the bottom and form an angle A3 of at least 4°, with each other as seen in a cross-sectional view.

13. The shell core according to claim 11, wherein the third groove is symmetrical about a centre line forming an angle A3/2 with the respective the side wall portions or side walls, the centre line being the bisecting line of the second groove.

14. A wind turbine blade extending from a root end to a tip end along a longitudinal axis and comprising a root region, a transition region and an airfoil region, the wind turbine blade comprising:
- a profiled contour with a leading edge and a trailing edge and a chord extending between the leading edge and the trailing edge; and
- a blade shell with a first blade shell part with a pressure side and a second blade shell part with a suction side, the first and second blade shell parts extending from the root end to the tip end and joined along a leading-edge glue joint and a trailing edge glue joint,
- wherein the first blade shell part comprises a first shell core arranged between an inner laminate and an outer laminate and the second blade shell part comprising a second shell core arranged between an inner laminate and an outer laminate, one of the first and second shell cores being a shell core according to claim 1, where the second core part have been bent at least 45° towards the first core part along the bottom of the first groove to bring the opposing wall portions of the first groove into mutual abutment and to provide a sharp inner corner having a sharp angle of at least 45° between the first core part of the shell core and the second core part of the shell core.

15. The wind turbine blade according to claim 14, wherein the second core part of the shell core forms part of a flatback section of the trailing edge of the blade.

16. The wind turbine blade according to claim 15, wherein the second part of the shell core has a height of at least 0.4 HF, where HF is the height of the flatback section in the respective cross-section.

17. A wind turbine blade extending from a root end to a tip end along a longitudinal axis and comprising a root region, a transition region and an airfoil region, the wind turbine blade comprising:
- a profiled contour with a leading edge and a trailing edge and a chord extending between the leading edge and the trailing edge;
- a blade shell with a first blade shell part with a pressure side and a second blade shell part with a suction side, the first and second blade shell parts extending from the root end to the tip end and joined along a leading-edge glue joint and a trailing edge glue joint,
- wherein the first blade shell part comprises a first shell core arranged between an inner laminate and an outer laminate and the second blade shell part comprising a second shell core arranged between an inner laminate and an outer laminate, each of the first and second shell cores being a shell core according to claim 1, where the second core part have been bent at least 45° towards the first core part along the bottom of the first groove to bring the opposing wall portions of the first groove into mutual abutment and to provide a sharp inner corner having a sharp angle of at least 45° between the first core part of the shell core and the second core part of the shell core,
- wherein the second part of the shell core forms part of a flatback section of the trailing edge of the blade, and
- wherein the second part of the shell core has a height of at least 0.4 HF, where HF is the height of the flatback section in the respective cross-section.

18. The shell core according to claim 3, wherein the angle A1 is between 70° and 110°.

19. The shell core according to claim 1, wherein the second surface of the shell core is formed of a fiber glass fabric scrim.

20. The shell according to claim 8, wherein the opposing walls have converging opposing wall portions, as seen from the first surface towards the bottom, and form an angle A2 of 6° to 40° with each other as seen in a cross-sectional view.

\* \* \* \* \*